3,133,083
DERIVATIVES OF 6-FLUOROTRYPTAMINE
Jackson B. Hester, Jr., Portage Township, Kalamazoo County, Mich., assignor to The Upjohn Company, Kalamazoo, Mich., a corporation of Delaware
No Drawing. Filed May 25, 1962, Ser. No. 197,574
3 Claims. (Cl. 260—319)

The present invention relates to novel 6-fluoro-3-(2-amino-2-alkylethyl)indoles and more particularly is directed to 6-fluoro-3-(2-amino-2-alkylethyl)indole free bases and pharmacologically acceptable acid addition salts thereof.

The novel 6-fluoro-3-(2-amino-2-alkylethyl)indole free bases of the present invention can be represented by the formula:

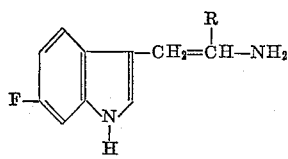

wherein R represents methyl and ethyl.

In view of the presence of an asymmetric carbon atom, the novel 6-fluoro-3-(2-amino-2-alkylethyl)indoles of the present invention can exist as the d- or l-isomers or as a racemic mixture. It is to be understood, therefore, that reference herein to 6-fluoro-3-(2-amino-2-alkylethyl)indole free bases and acid addition salts thereof is intended to cover the racemic mixture as well as the specific d- and l-isomers.

The novel compounds of the present invention can be prepared by various procedures known in the art. For example, the novel 6-fluoro-3-(2-amino-2-alkylethyl)indole free bases can be prepared by the process disclosed by Snyder et al., J. Am. Chem. Soc. 69, 3140, 1947. 6-fluoro-gramine (British Patent 846,675) is reacted with nitroethane or 1-nitropropane and the resulting 6-fluoro-3-(2-nitro-2-alkylethyl)indole is hydrogenated in the presence of a base metal catalyst, e.g., Raney nickel, or a noble metal catalyst, e.g., platinum oxide, or is reduced with lithium aluminum hydride.

Alternatively, the novel 6-fluoro-3-(2-amino-2-alkylethyl)indole free bases can be prepared by the process disclosed by Heinzelman et al., J. Org. Chem. 25, 1548, 1960. 6-fluoroindole-3-carboxaldehyde is reacted with nitroethane or 1-nitropropane to produce a 2-(6-fluoroindoleninidenium)ethyl nitronate and the nitronate is reduced with lithinum aluminum hydride. The starting 6-fluoroindole-3-carboxaldehyde can be prepared by the process disclosed by Smith, J. Chem. Soc., 1954, 3842, by utilizing 6-fluoroindole instead of indole as the starting reactant.

The 6-fluoro-3-(2-amino-2-alkylethyl)indole acid addition salts of the present invention can be readily prepared by mixing a free base of the invention and an organic or inorganic acid in an aqueous or non-aqueous medium. Examples of acids are hydrochloric, hydrobromic, sulfuric, phosphoric, pyruvic, acetic, tartaric, citric, benzoic, tamoic and like pharmacologically acceptable acids.

The following examples are illustrative of the products of the present invention, but are not to be construed as limiting.

EXAMPLE 1.—6-FLUORO-3-(2-AMINOBUTYL)INDOLE FREE BASE AND HYDROCHLORIDE THEREOF

A. *6-Fluoro-3-(2-Nitrobutyl)Indole*

A stream of nitrogen was passed through a refluxing mixture of 2.7 g. of finely ground sodium hydroxide, 13.58 g. (0.0707 mole) of 6-fluorogramine, and 100 ml. of 1-nitropropane. After 10 hours the evolution of dimethylamine had ceased. The mixture was cooled, diluted with ether, and extracted successively with dilute acetic acid, water, dilute ammonium hydroxide and saturated sodium chloride solution. The ether solution was then filtered through anhydrous sodium sulfate and concentrated under reduced pressure. The excess 1-nitropropane was removed by azeotropic distillation with toluene and benzene to yield 6-fluoro-3-(2-nitrobutyl)indole as a light tan oil.

B. *6-Fluoro-3-(2-Aminobtuyl)Indole Free Base and Hydrochloride Thereof*

A solution of the 6-fluoro-3-(2-nitrobutyl)indole of Part A in 200 ml. of dry tetrahydrofuran was added slowly, under nitrogen, with stirring to a solution of 14 g. of lithium aluminum hydride in 200 ml. of dry tetrahydrofuran. The mixture refluxed gently during the addition and gas was evolved. An additional 100 ml. of tetrahydrofuran was added to the reaction mixture which was allowed to reflux for 5.5 hours, was cooled in an ice bath, and was treated successively with water (14 ml., dropwise), 15% aqueous sodium hydroxide solution (14 ml.), and water (28 ml.). The resulting solid was collected by filtration and washed with ether. Concentration of the combined filtrate and washings yielded 6-fluoro-3-(2-aminobutyl)indole free base as an oil which was dissolved in ethyl acetate and acidified with ethanolic hydrogen chloride. Recrystallization of the precipitated 6-fluoro-3-(2-aminobutyl)indole hydrochloride from ethanol-ethyl acetate yielded 10.35 g. (60.2% based on the starting 6-fluorogramine) of the compound melting between 210–211.5° C. An analytical sample (prepared by a second recrystallization from ethanol-ethyl acetate) melted between 211–212.5° C.

*Analysis.*—Calcd. for $C_{12}H_{16}ClFN_2$: C, 59.38; H, 6.65; N, 11.54; Cl, 14.61; F, 7.83. Found: C, 59.24; H, 6.72; N, 11.46; Cl, 14.55; F, 7.69.

In the same manner as shown in Example 1, 6-fluoro-3-(2-aminobutyl)indole sulfate, hydrobromide, phosphate, pyruvate, acetate, tartrate, citrate, benzoate and pamoate were prepared by substituteing sulfuric, hydrobromic, phosphoric, pyruvic, acetic, tartaric, citric, benzoic and pamoic acid, respectively, for hydrogen chloride.

EXAMPLE 2.—6-FLUORO-3-(2-AMINOPROPYL) INDOLE FREE BASE AND HYDROCHLORIDE THEREOF

In the same manner as shown in Example 1, 6-fluoro-3-(2-aminopropyl)indole free base was prepared by substituting nitroethane for 1-nitropropane, and 6-fluoro-3-(2-aminopropyl)indole hydrochloride was prepared by substituting 6-fluoro-3-(2-aminopropyl)indole free base for 6-fluoro-3-(2-aminobutyl)indole free base.

In the same manner as shown in Example 2, 6-fluoro-3-(2-aminopropyl)indole hydrobromide, sulfate, phosphate, pyruvate, acetate, tartrate, citrate, benzoate, and pamoate were prepared by substituting hydrobromic, sulfuric, phosphoric, pyruvic, acetic, tartaric, citric, benzoic and pamoic acid, respectively, for hydrogen chloride.

The novel compounds of the present invention are useful in animals and mammals, especially humans, as monamine oxidase inhibitors, central nervous system stimulants, and anorexigenic agents. Thus, in rats when administered intraperitoneally the novel compounds have the ability to inhibit the monamine oxidase enzyme. In mice the compounds of the present invention have also demonstrated a central nervous system stimulating activity when administered intraperitoneally. As anorexigenic agents the compounds of the present invention have demonstrated the ability to reduce appetites in dogs when administered intraperitoneally or orally, preferably orally.

I claim:
1. A compound selected from the group consisting of (1) 6-fluoro-3-(2-amino-2-alkylethyl)indoles having the formula:

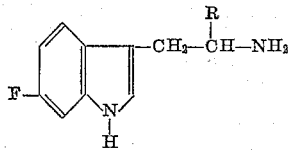

wherein R is selected from the group consisting of methyl and ethyl, and (2) pharmacologically acceptable acid addition salts thereof.
2. 6-fluoro-3-((2-aminobutyl)indole.
3. 6-fluoro-3-(2-aminobutyl)indole hydrochloride.

References Cited in the file of this patent
FOREIGN PATENTS
1,201,548   France _____ July 15, 1954

OTHER REFERENCES
Snyder et al.: J. Am. Chem. Soc., vol. 69, pp. 3140–1 (1947).
Young: J. Chem. Soc. (London), pp. 3493–3496 (1958).
Velluz: Annals Pharmaceut. Françaises, vol. 17, pp. 20 (1959).
Heinzelman et al.: J. Org. Chem. vol. 25, pp. 1548 (1960).
Heinzelman et al.: J. Org. Chem., vol. 25, pp. 1548–1552 (1960).
Vane: British Journal of Pharmacol., vol. 14; pp. 87–107 (1959).